(12) United States Patent
Benayoun et al.

(10) Patent No.: US 6,888,884 B2
(45) Date of Patent: May 3, 2005

(54) METHOD AND SYSTEM FOR DYNAMICALLY INVERTING AN ASYMMETRIC DIGITAL SUBSCRIBER LINE (ADSL) SYSTEM

(75) Inventors: Alain Benayoun, Cagnes sur Mer (FR); Jean-Francois Le Pennec, Nice (FR); Patrick Michel, La Gaude (FR); Gilles Toubol, Villeneuve-Loubet (FR)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 09/755,687

(22) Filed: Jan. 5, 2001

(65) Prior Publication Data

US 2001/0016000 A1 Aug. 23, 2001

(30) Foreign Application Priority Data

Jan. 6, 2000 (EP) .......................................... 00480014

(51) Int. Cl.[7] .............................................. H04B 1/38
(52) U.S. Cl. ..................... 375/222; 370/431; 370/485; 370/276; 370/468; 379/93.08
(58) Field of Search ................................ 375/222, 354, 375/219; 370/431, 485, 276, 468, 236, 465; 379/93.08; 709/233

(56) References Cited

U.S. PATENT DOCUMENTS

| | | | | |
|---|---|---|---|---|
| 4,258,433 A | * | 3/1981 | Herschtal et al. | 370/465 |
| 5,214,650 A | * | 5/1993 | Renner et al. | 370/276 |
| 5,812,786 A | * | 9/1998 | Seazholtz et al. | 709/233 |
| 5,883,907 A | * | 3/1999 | Hoekstra | 714/784 |
| 5,995,568 A | * | 11/1999 | Molnar et al. | 375/354 |
| 5,999,540 A | * | 12/1999 | McGhee | 370/465 |
| 5,999,563 A | * | 12/1999 | Polley et al. | 375/222 |
| 6,088,385 A | * | 7/2000 | Liu | 375/219 |
| 6,246,695 B1 | * | 6/2001 | Seazholtz et al. | 370/468 |
| 6,424,626 B1 | * | 7/2002 | Kidambi et al. | 370/236 |
| 6,501,791 B1 | * | 12/2002 | Hwang | 375/222 |
| 6,693,916 B1 | * | 2/2004 | Chaplik et al. | 370/485 |
| 6,735,245 B1 | * | 5/2004 | Palm | 375/222 |
| 6,741,604 B1 | * | 5/2004 | Rippin et al. | 370/431 |
| 2002/0067811 A1 | * | 6/2002 | Matsumoto | 379/93.08 |

* cited by examiner

*Primary Examiner*—Stephen Chin
*Assistant Examiner*—Sudhanshu C. Pathak
(74) *Attorney, Agent, or Firm*—Daniel E. McConnell; John R. Pivnichny; Dillon & Yudell LLP

(57) ABSTRACT

A method and system for dynamically inverting an A symmetric Digital Subscriber Line (ADSL) system. The ADSL system includes a central exchange equipment (CE) connected to a service provider network and a user equipment (UE) connected to a user workstation. The CE and UE are interconnected by a PSTN link. The CE includes an ADSL transceiver and a splitter coupled between the CE transceiver and the PSTN link. The splitter includes a low-pass filter for separating low frequency voice signals from high frequency ADSL signals transmitted from the UE. In accordance with the method of the invention, an invert request message encoded as a tone sequence is generated by the UE and transmitted to the CE over the PSTN link. The tone-encoded invert request is received through the CE splitter low-pass filter and is decoded utilizing a tone decoder communicatively coupled between the CE splitter low-pass filter and the CE transceiver.

11 Claims, 5 Drawing Sheets

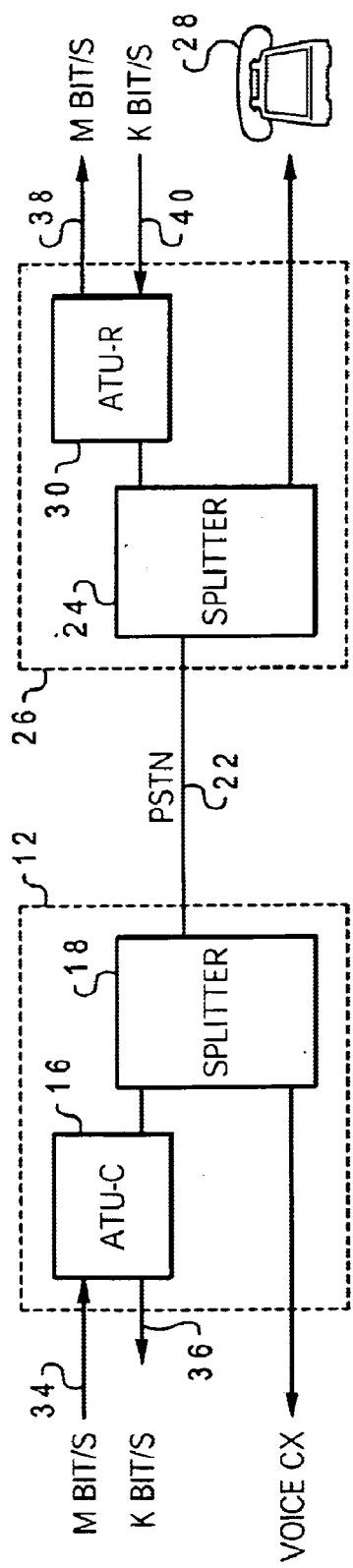
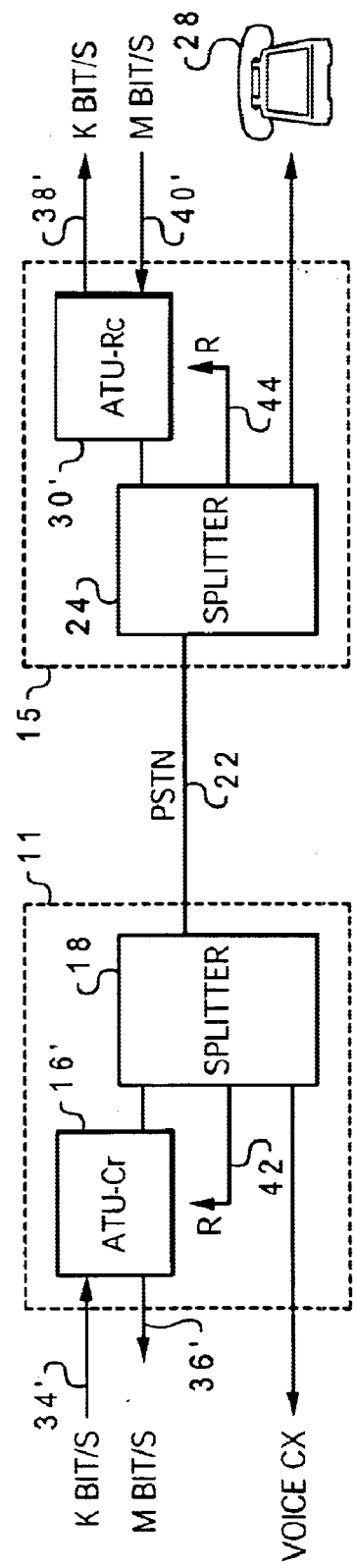
Fig. 2A Prior Art
Fig. 2B

METHOD AND SYSTEM FOR DYNAMICALLY INVERTING AN ASYMMETRIC DIGITAL SUBSCRIBER LINE (ADSL) SYSTEM

BACKGROUND OF THE INVENTION

1. Technical Field

The present invention relates to the Asymmetric Digital Subscriber Line (ADSL) connections established between an access node of service provider network such as the Internet network and a user workstation, and relates in particular to a system and method for dynamically inverting an ADSL system.

2. Description of the Related Art

Modems are used to enable two computers to communicate via the Public Switched Telephone Network (PSTN). The latter carries only analog signals and modems are used to translate digital data from a computer into a series of high-frequency signals that can be transported over phone lines. When such analog signals arrive at the destination, they are demodulated into digital data for the receiving computer.

Digital Subscriber Line (DSL) modems provide a digital subscriber line within the extant PSTN network. A DSL modem transmits duplex data at higher speed than conventional modems. Such DSL modems use a twisted pair having a bandwidth from 0 to approximately 80 kHz, which precludes the simultaneous use of analog telephone service in most cases.

Asymmetric Digital Subscriber Line (ADSL), a new modem technology, belongs to the DSL family and converts existing twisted-pair telephone lines into access paths for multimedia and high-speed data communications. ADSL transmits more than 6 Mbps to a subscriber or user premises, and as much as 640 kbps in the reverse direction. Such rates expand existing access capacity by a factor of 50 or more without requiring new cabling. ADSL can transform the existing public information network from one limited to voice, text and low resolution graphics, to a powerful, ubiquitous system capable of bringing multimedia, including full motion video, to everyone's home this century.

The ADSL system will play an important role over the next ten or more years as telephone companies enter new markets for delivering information in video and multimedia formats. New broadband cabling will take decades to reach all prospective subscribers. The success of these new services will depend upon reaching as many subscribers as possible during the first few years. By bringing movies, television, video catalogs, remote CD-ROMs, corporate LANs, and the Internet into homes and small businesses, ADSL will make these markets viable, and profitable, for telephone companies and application suppliers alike.

Many applications foreseen for ADSL involve digitally compressed video. As a real time signal, digital video cannot use link or network level error control procedures commonly found in data communications systems. ADSL modems therefore incorporate forward error correction that dramatically reduces errors caused by impulse noise. Error correction on a symbol-by-symbol basis also reduces errors caused by continuous noise coupled into a line.

In an ADSL system, there is an ADSL modem on each end of a twisted-pair telephone line, creating three information channels: a high-speed downstream channel; a medium-speed duplex channel, depending on the implementation of the ADSL architecture; and a POTS (Plain Old Telephone Service) or an integrated services digital network (ISDN) channel. The POTS/ISDN channel is split off from the digital modem by filters, thus guaranteeing uninterrupted POTS/ISDN, even if ADSL fails. The high-speed channel ranges from 1.5 to 6.1 Mbps, while duplex rates range from 16 to 640 kbps.

The minimum configuration provides 1.5 or 2.0 Mbps downstream and a 16 kbps duplex channel. ADSL modems will accommodate ATM transport with variable rates and compensation for ATM overhead, as well as IP protocols. Downstream data rates depend on a number of factors, including the length of the copper line, its wire gauge, presence of bridged taps, and cross-coupled interference. Line attenuation increases with line length and frequency, and decreases as wire diameter increases.

Each ADSL channel can be submultiplexed into multiple lower rate channels. To create multiple channels, ADSL modems divide the available bandwidth of a telephone line in one of two ways, Frequency Division Multiplexing (FDM) or Echo Cancellation. FDM assigns one band for upstream data and another band for downstream data. The downstream path is then divided by time division multiplexing into one or more high-speed channels and one or more low-speed channels. The upstream path is also multiplexed into corresponding low-speed channels. Echo Cancellation assigns the upstream band to overlap the downstream, and separates the two by means of local echo cancellation, a technique well known in V.32 and V.34 modems. With either technique, ADSL splits off a 4 kHz region for POTS at the DC end of the band.

The asymetric nature of ADSL, however, does not enable an ASDL system to utilize the overall bandwidth for some applications wherein the user workstation acts as a server for the transmission of large files, a video conference, or a data distribution. Conventional ADSL systems are thus only suitable for applications requiring high-speed transmission in a single direction.

SUMMARY OF THE INVENTION

Accordingly, an object of the invention is to provide a method for dynamically inverting an Asymmetric Digital Subscriber Line (ADSL) system, enabling the user workstation, which normally transmits data only over the medium-speed channel, to transmit data over the high-speed channel if necessary.

A method and system for dynamically inverting an Asymmetric Digital Subscriber Line (ADSL) system are disclosed herein. The ADSL system includes a central exchange equipment (CE) connected to a service provider network and a user equipment (UE) connected to a user workstation. The CE and UE are interconnected by a PSTN link. The CE includes an input line for receiving high-speed data from the service provider network which is then transmitted to the user workstation via a PSTN link, and further includes an output line for sending medium-speed data received from the user workstation to the service provider network. The CE further employs ADSL coding/decoding means for coding the high-speed data and decoding the medium-speed data. The UE includes an input line for receiving medium-speed data from the user workstation which is then transmitted to the service provider network via the PSTN link, and further includes an output line for sending high-speed data received from the service provider network to the user workstation. The UE further includes ADSL coding/decoding means for coding the medium-speed data and decoding the high-speed data. In accordance with the present invention, a low-frequency channel employing a tone generator is utilized to transmit an inverting request message from the UE to the CE which is decoded a low-frequency tone decoder means associated with the CE. Responsive to the decoded inverting request, the CE coding/decoding means are activated for coding medium-speed data on the CE input line and decoding high-speed data on the CE output line.

BRIEF DESCRIPTION OF THE DRAWINGS

The above and other objects, features and advantages of the invention will be better understood by reading the following more particular description of the invention in conjunction with the accompanying drawings wherein:

FIGS. 2A and 2B illustrate, respectively, a block diagram of a conventional ADSL system including the central exchange equipment, and a block diagram of an ADSL system incorporating reverse mode switching features in accordance with a preferred embodiment of the present invention;

DETAILED DESCRIPTION OF THE PREFERRED EMBODIMENT

Figure 1:
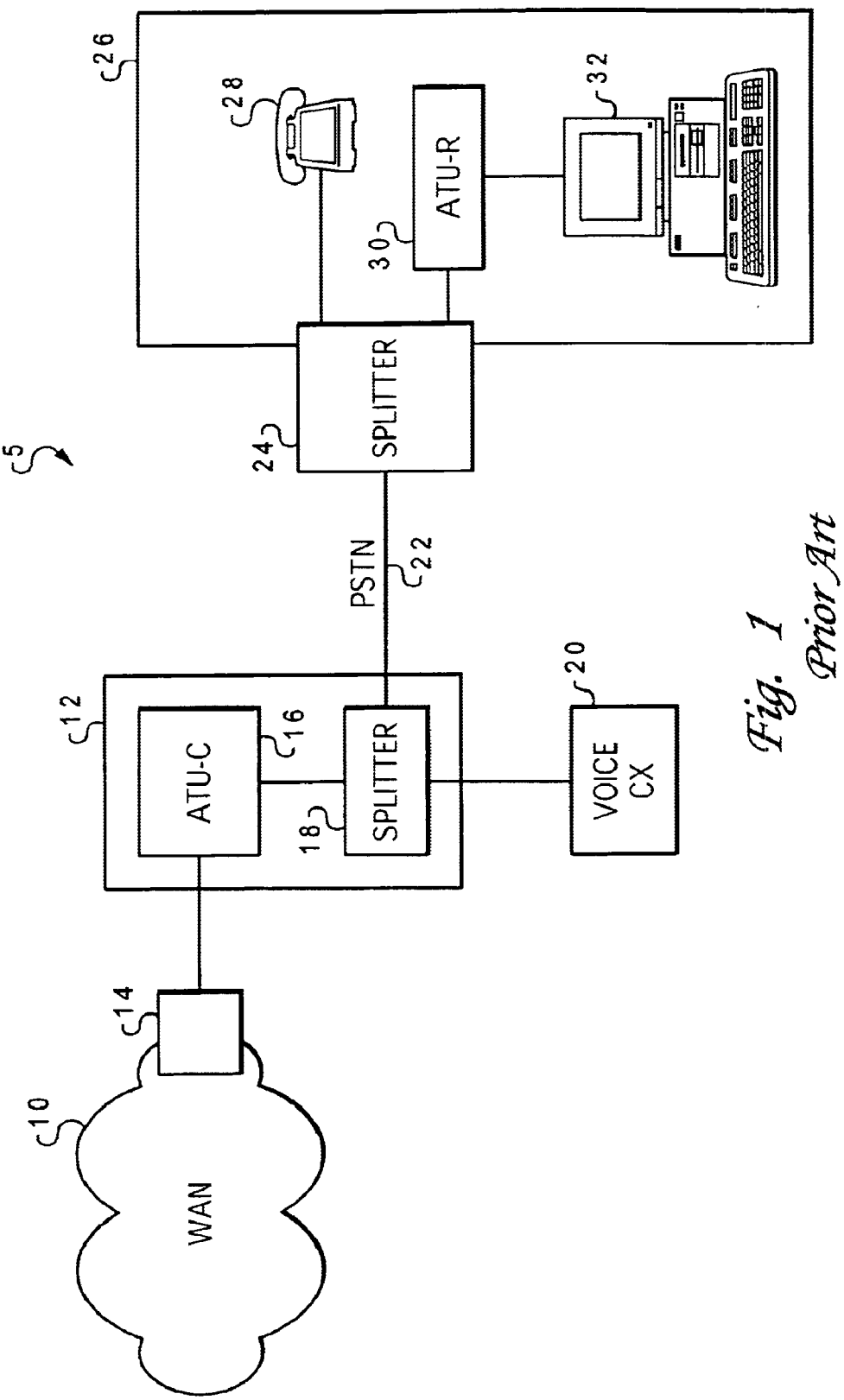
FIG. 1 is a schematic representation of a conventional ADSL system including an ADSL central exchange equipment connected to a service provider network and an ADSL user equipment connected to a user workstation.

With reference now to the figures wherein like reference numerals refer to like and corresponding parts throughout, and in particular with reference to FIG. 1, there is depicted a communication system 5 including a service provider WAN 10, which may be the Internet network connected to a central exchange equipment (CE) 12 by means of an access node 14. CE 12 includes an ADSL Transceiver Unit ATU-C 16 and a splitter 18, which splits/merges the low bandwidth voice signals exchanged with a voice CX 20 with modulated data on a PSTN twisted pair 22.

On the other side, the PSTN twisted pair 22 is also connected to a splitter 24 in a user equipment (UE) 26. Splitter 24 is connected to a telephone set (POTS) 28 to handle voice communications on the one hand, and to an ADSL Transceiver Unit ATU-R 30 on the other hand. ATU-R 30 is connected to a workstation 32 in the depicted embodiment but could also be attached to a LAN such as the Ethernet network.

Referring to FIG. 2A, there is illustrated a block diagram of a conventional ADSL system including CE 12 of FIG. 1. According to the configuration illustrated in FIG. 2A, CE 12 includes ATU-C 16 and splitter 18 (connected to voice central exchange CX) and is provided with an input line 34 for receiving high-speed data in the range of several Mbits/s (e.g. 6 Mbits/s), from the access node (depicted in FIG. 1), and an output line 36 for outputting medium-speed data in the range of several hundred of kbits (e.g., 640 kbits/s) to the acess node. Both input line 34 and output line 36 are connected to ATU-C 16. On the other side of the ADSL system depicted in FIG. 2A, user equipment UE 26 includes splitter 24 (connected to POTS 28) and ATU-R 30 to which are connected an output line 38 for delivering high-speed data received from CE 12 to a user workstation (depicted in FIG. 1 as workstation 32), and further includes an input line 40 for receiving medium-speed data from the user workstation which is then delivered to CE 12 via PSTN link 22.

Turning to FIG. 2B, there is depicted an ADSL system incorporating reverse mode switching features according to the present invention. The ADSL system shown in FIG. 2B includes a CE 11 coupled to a UE 15 over PSTN link 22. In a preferred embodiment, each of splitters 18 and 24 includes a request R line 42 and 44, respectively, over which is forwarded a tone sequence of low frequency signals that is used by ATU-C 16 or ATU-R 30 for dynamically inverting the system. Assuming, for example, that a user wants to transmit high-speed data on input line 40', a tone sequence is generated by and forwarded from a tone generator (depicted in FIG. 3) that is preferably included within splitter 24. Upon detecting the tone sequence, splitter 24 and 18 activate respective invert request R lines 44 and 42, wherein each of invert request lines 44 and 42 deliver decoded invert request transaction messages to ATU-Rc 30' and ATU-Cr 16', resulting, as explained in further detail with reference to FIG. 3. in ATU-Cr 16' switching to inverted mode and functioning as an ATU-R with input line 34' receiving medium-speed data that is coded as medium speed data within ATU-Cr 16' and output line 36' delivering high-speed data that has been decoded as high-speed data by ATU-Cr 16'. Conversely, ATU-R 30 switches to inverted mode ATU-Rc 30' that functions as an ATU-C having input line 40' receiving high-speed data that is coded as high-speed data by inverted mode ATU-Rc 30' and output line 38' delivering medium-speed data that has been decoded as medium speed data by inverted mode ATU-Rc 30'.

An alternate method for dynamically inverting the ADSL system of FIG. 2A is to incorporate a control channel between ATU-C 16 and ATU-R 30 within the data bandwidth wherein an invert request message is transmitted. This method may be used as long as the settings on both sides match, thereby allowing data extraction. In case of failure of this data channel caused by a incorrect synchronization of the reverse function for example, the tone sequence method may correct the failure and can be considered as a low level activation method.

Figure 3:
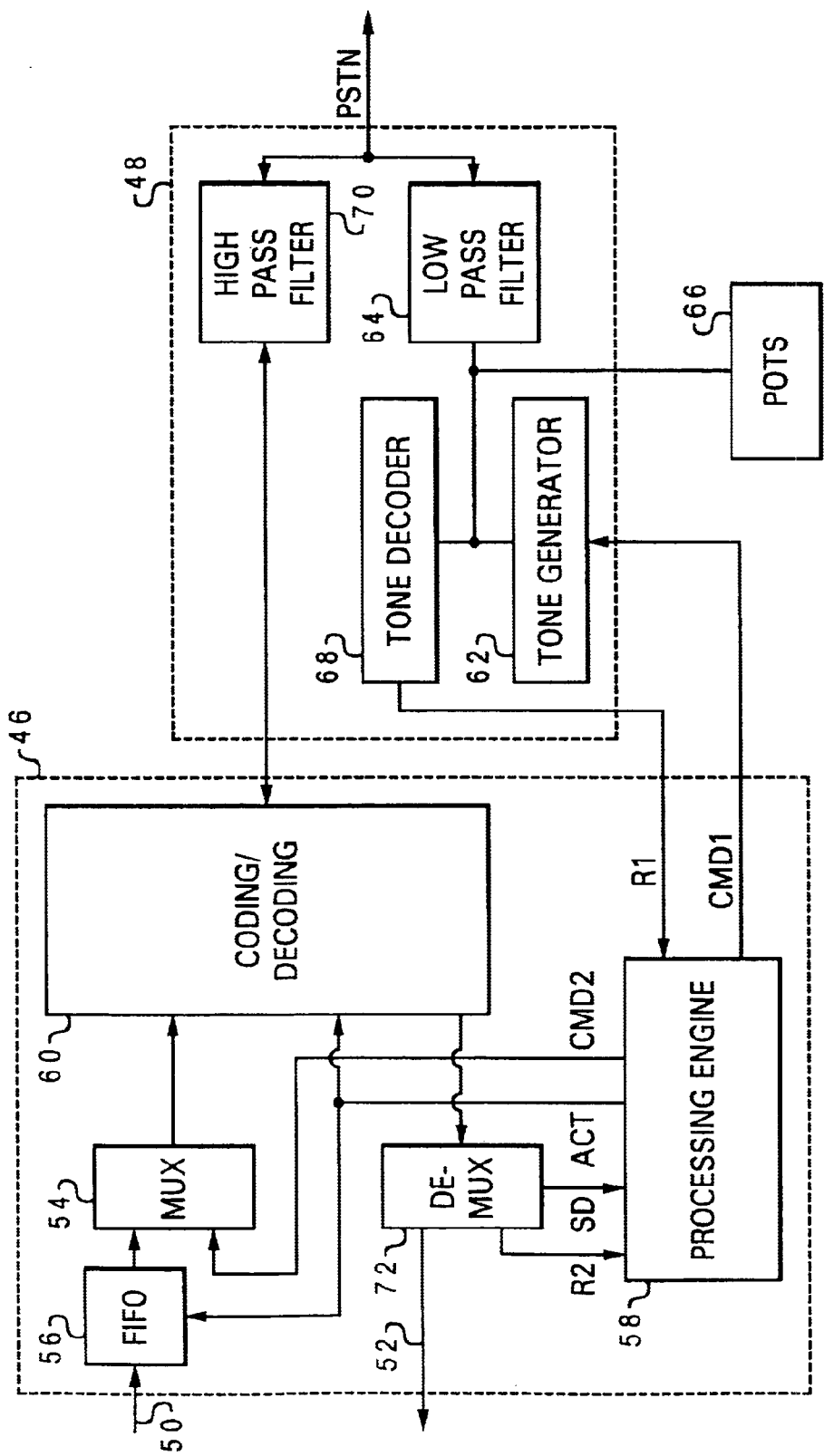
FIG. 3 is a block diagram depicting an ADSL transceiver unit incorporated within ADSL central exchange equipment or within ADSL user equipment in accordance with a preferred embodiment of the present invention.

With reference now to FIG. 3, there is depicted a detailed block diagram of ADSL equipment including an ATU-Cr 46 and a splitter 48 in accordance with a preferred embodiment of the present invention. As illustrated in FIG. 3, ATU-Cr 46 includes an input line 50 for inputting high-speed data and an output line 52 for outputting medium-speed data when operating in the default (i.e. non-inverted) mode. The ADSL equipment illustrated in FIG. 3 is likewise representative of a corresponding end-user equipment, i.e., a ATU-Rc unit. It should be noted that many channels that are multiplexed together may be defined as inputs. This is the case, for example, when a full duplex low-speed channel is incorporated using a portion of the bandwidth from the high-speed downstream channel. As additional bandwidth becomes available, more channels are defined, and when the bandwidth is reduced, some channels are suppressed.

Data delivered over line 50 is encoded in a superframe structure by a multiplexer 54. A FIFO buffer 56 is connected to an input of multiplexer 54 to store the frames during transition when the reverse function is applied as seen hereafter. Multiplexer 54 may multiplex one or several data channels in addition to one control channel from a processing engine 58. During a typical transmission, FIFO buffer 56 should be empty or nearly empty. ADSL coding is performed by a coding/decoding unit 60. Such coding includes constellation encoding and gain scaling, modulation such as inverse Discrete Fourier Transform, output parallel or serial buffering, and digital/analog conversion.

There are two ways to invert the system to facilitate transmission of high-speed data from the user workstation. First, and in a preferred embodiment, in response to receiving a CMD1 request from processing engine 58, a tone generator 62, which as depicted is coupled to a low pass filter 64 within splitter 48 in the user equipment generates a tone sequence (low frequency signals) that is transmitted on the PSTN twisted pair via a low pass filter 64. Low pass filter 64 serves principally to separate voice signals which are exchanged with a POTS 66. When the tone sequence is received in the central exchange equipment, it is decoded by a tone decoder 68 that is also incorporated within the corresponding splitter 48. Tone decoder 68 sends a R1 command to inform processing engine 58 of the invert request.

The second way of inverting the ADSL system to facilitate transmission of high-speed data from the user workstation employs an inverting request message that is encoded in the superframe via a CMD2 command from processing engine 58 within the user equipment. Command CMD2 is then multiplexed with data by multiplexer 54 before being coded by coding/decoding unit 60 and transmitted over the PSTN twisted pair to the central exchange equipment.

Upon arrival at the central exchange equipment from the PSTN twisted pair, digital data (including the control channel) is first received by high pass filter 70 before being decoded by coding/decoding unit 60 wherein it is decoded. The decoded data is supplied to demultiplexer 72 which extracts the control channel and delivers it to processing engine 58 over line R2. In response to processing engine 58 of the central exchange equipment receiving either command R1 from tone decoder 68, or command R2 from demultiplexer 72, processing engine 58 asserts an ACT instruction which is a request for inverting the activation of coding/decoding unit 60. Upon receiving the activation inversion instruction, coding/decoding unit 60 performs all necessary steps for processing the input data on line 50 as medium-speed data and the output data on line 52 as high-speed data.

Upon setting the ACT line, processing engine 58 either sends a command CMD1 to tone generator 62 or sends a command CMD2 to be inserted in the control channel by multiplexer 54. The command CMD1 is sent for transmitting a tone sequence over the PSTN twisted pair to the user equipment, while CMD2 is for transmitting medium-speed data over the PSTN twisted pair. In either case, the message being sent is an acknowledgment to the user equipment authorizing it to transmit high-speed data from its ATU input line. It should be noted that the acknowledgment message may be replaced by the superframe itself. In such a case, a line SD to the processing engine of the user equipment is asserted when a medium-speed superframe is detected by demultiplexer 72 of the user equipment.

Upon receipt of an acknowledgment message from the central exchange equipment, i.e., a detected tone sequence, a decoded command CMD2 in the control channel, or a detected medium-speed superframe, the user equipment activates its coding/decoding unit 60 as explained hereinabove. At the same time, another acknowledgment message is transmitted to the central exchange equipment in the same way that the first acknowledgment message was transmitted from the central exchange equipment to the user equipment. The second acknowledgment message could be replaced by the superframe itself as previously explained by setting the SD line from demultiplexer 72 to processing engine 58 in the central exchange equipment.

With respect to FIGS. 2 and 3, it should be noted that all of the incoming data on input line 40 in the user equipment is stored in FIFO buffer 56 during the time interval between sending the inverting request message to the central exchange and receiving the first acknowledgment message from the central exchange equipment, or during the interval of time between sending a superframe (generally empty) to the central exchange equipment and receiving a superframe from the same central exchange equipment. Furthermore, all of the incoming data on input line 50 in the central exchange equipment are stored in FIFO buffer 56 during the time interval between sending the first acknowledgment message to the user equipment and receiving the second acknowledgment message from the user equipment, or during the interval of time between sending a superframe (generally empty) to the user equipment and receiving a superframe from the same user equipment.

Figure 4:
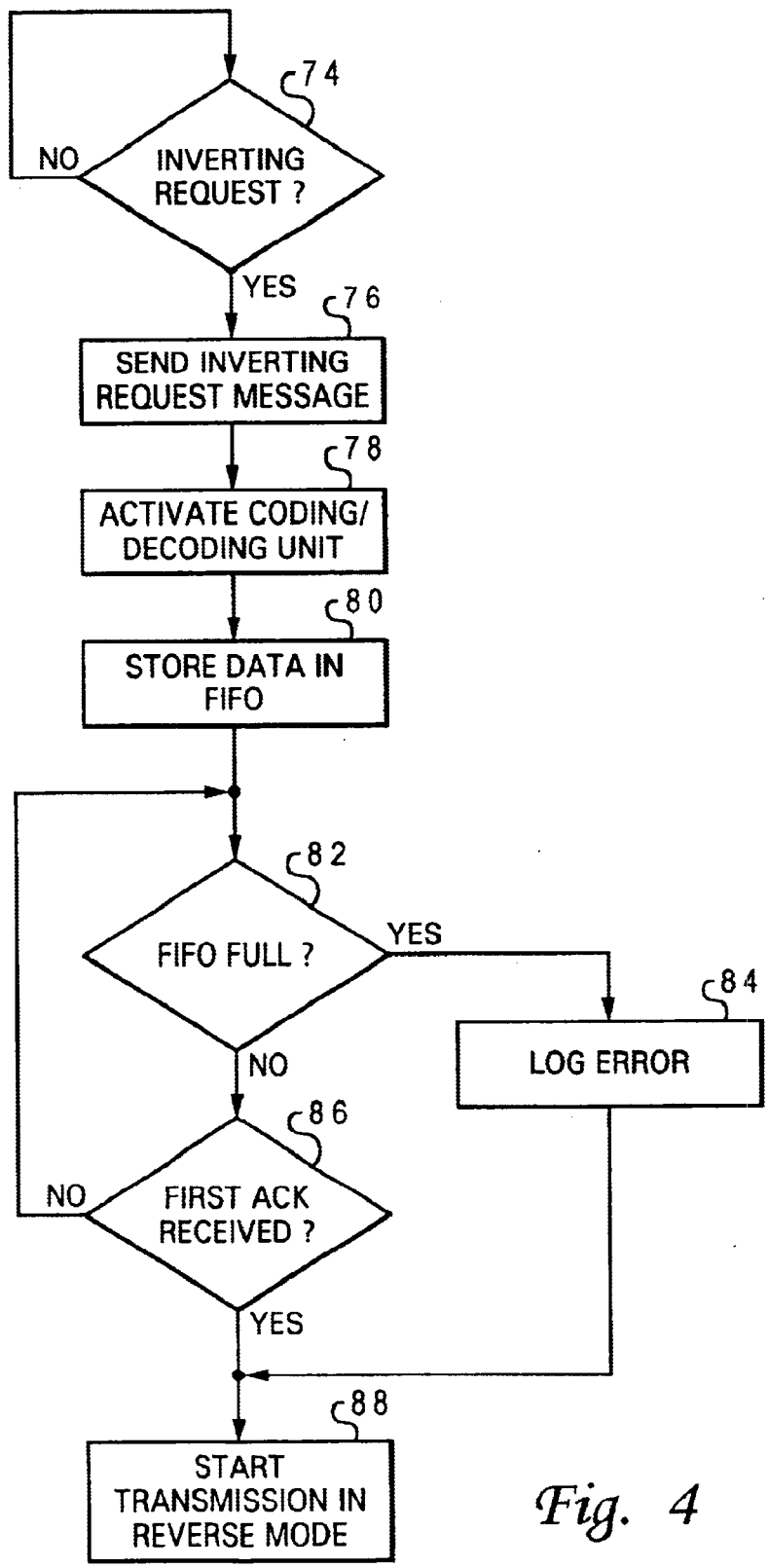
FIG. 4 is a flow diagram of the steps followed by ADSL user equipment for implementing the method of the present invention.

Referring to FIG. 4, there is illustrated a flow diagram of the steps performed by ADSL user equipment for implementing the method of the present invention. The process is initialized when the user workstation requests to invert the ADSL system (step 74). Upon receiving the invert request, the ADSL user equipment executes the following three steps as described hereinabove: the ADSL user equipment sends an inverting request message to the central exchange equipment (step 76); the ADSL user equipment activates its coding/decoding unit to switch into the reverse mode (step 78); and the ADSL user equipment begins storing data to be transmitted in its FIFO buffer (step 80). A determination is made of whether or not the FIFO buffer is full (step 82) without receiving the first acknowledgment from the CE equipment. If the FIFO buffer is full, an error flag is logged (step 84). If not, a determination is made of whether or not the first acknowledgment has been received when the FIFO is not full (step 86). If the first acknowledgment is not received, the process loops back to step 82. When it is determined that the FIFO is full, or that the first acknowledgment has been received when the FIFO buffer is not full, the transmission in reverse mode is initiated (step 88).

Figure 5:
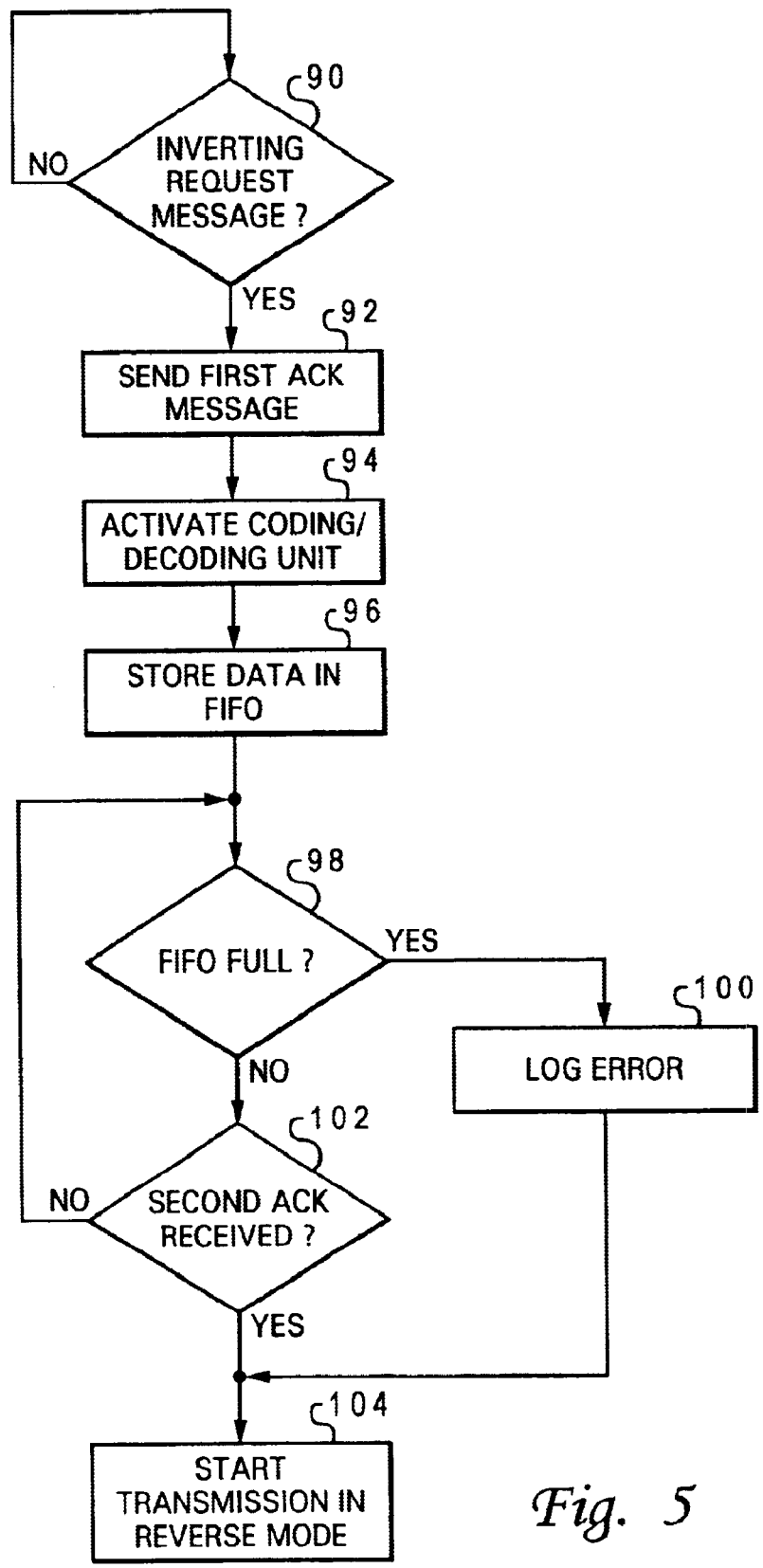
FIG. 5 is a flow diagram of the steps followed by ADSL central exchange equipment for implementing the method of the present invention.

With reference now to FIG. 5, there is depicted a flow diagram of the steps performed by ADSL central exchange equipment for implementing the method of the present invention. The process is initialized when the central exchange equipment receives an inverting request message from the user equipment (step 90). Upon receiving an inverting request message, the central exchange equipment executes the following steps: a first acknowledgment is sent to the user equipment (step 92); the coding/decoding unit of the central exchange equipment is activated to switch into the reverse mode (step 94); and the data to be transmitted from the user equipment to the central exchange equipment are stored in the FIFO buffer of the user equipment (step 96). Next, it is determined whether or not the FIFO buffer is full (step 98) prior to receiving the second acknowledgment from the central exchange equipment. If the FIFO buffer is full, an error flag is logged (step 100). If the FIFO buffer is not full, it is next determined whether or not the second acknowledgment has received while the FIFO is not full (step 102). If the second acknowledgment is not received, the process is loops back to step 98. When it is determined that the FIFO is full or that the second acknowledgment has been received while the FIFO buffer is not full, the transmission in reverse mode is initiated (step 104).

What is claimed is:

1. A method for dynamically inverting an Asymmetric Digital Subscriber Line (ADSL) system comprising a central exchange equipment (CE) connected to a service provider network and a user equipment (UE) connected to a user workstation, wherein said CE and said UE are interconnected by a PSTN link, said CE including an ADSL transceiver and a splitter coupled between said CE transceiver and said PSTN link, said CE splitter including a low-pass filter for separating low frequency voice signals from high frequency ADSL signals transmitted from said UE over said PSTN link, said method comprising:

generating an invert request message encoded as a tone sequence within said UE and transmitted to said CE over said PSTN link;

receiving the tone-encoded invert request through the CE splitter low-pass filter; and decoding the received tone-encoded invert request utilizing a tone decoder communicatively coupled between the CE splitter low-pass filter and said CE transceiver.

2. The method of claim 1, wherein said CE transceiver includes an input line from said service provider network and an output line to said service provider network and further includes CE coding/decoding means that, in a non-inverted ADSL operating mode, ADSL code high-speed data received from the service provider network on the CE transceiver input line and decode medium-speed ADSL data to be delivered to the service provider network over the CE transceiver output line, said method further comprising, responsive to said CE transceiver detecting the decoded invert request message, activating the CE coding/decoding means to ADSL code medium-speed data received on said CE transceiver input line and decode high-speed ADSL data to be delivered to the service provider network over said CE transceiver output line.

3. The method of claim 2, wherein said activating the CE coding/decoding means includes:

receiving the decoded invert request message at a processing engine within said CE transceiver, wherein said processor is communicatively coupled between said tone decoder and said CE coding/decoding means; and responsive to receiving the decoded invert request message, delivering an activate command from said processor to said CE coding/decoding means.

4. The method of claim 1, wherein said UE includes an ADSL transceiver, said generating an invert request comprising generating a tone sequence utilizing a tone generator communicatively coupled between said UE transceiver and said PSTN link.

5. The method of claim 4, wherein said generating an invert request message encoded as a tone sequence is initiated responsive to said tone generator receiving an invert request command from a UE transceiver processing engine.

6. The method of claim 4, wherein said UE includes a UE transceiver having an input line from said user workstation and an output line to said user workstation and further having UE coding/decoding means that, in a non-inverted ADSL operating mode, ADSL code medium-speed data received from the user workstation over the UE transceiver input line and decode high-speed ADSL data to be delivered to the user workstation over the UE transceiver output line, said method further comprising, responsive to the invert request message, activating said UE coding/decoding means to ADSL code high-speed data received from the user workstation on the UE transceiver input line and decode medium-speed ADSL data to be delivered to the user workstation over the UE transceiver output line.

7. The method of claim 6, wherein said UE further includes a splitter coupled between said UE transceiver and said PSTN link, said UE splitter comprising a low-pass filter for separating low frequency voice signals from high frequency ADSL signals transmitted from said CE over said PSTN link, and wherein said tone generator is communicatively coupled between said UE transceiver and said UE low-pass filter.

8. The method of claim 7, further comprising, responsive to said CE transceiver detecting the decoded invert request message, generating and transmitting a first acknowledge message from said CE to said EU.

9. The method of claim 8, wherein said generating and transmitting a first acknowledge message comprises:

generating the first acknowledge message encoded as a tone sequence within said CE and transmitted to said UE over said PSTN link;

receiving the tone-encoded acknowledge message through the UE splitter low-pass filter; and decoding the received invert request utilizing a tone decoder communicatively coupled between the UE splitter low-pass filter and said UE transceiver.

10. The method of claim 8, further comprising, responsive to said UE receiving the first acknowledge message, generating and transmitting a second acknowledge message from said UE to said CE, wherein said second acknowledge message is a tone sequence generated by said tone generator.

11. The method of claim 10, further comprising:

responsive to said CE transceiver detecting said invert request message, storing data received by said CE transceiver from said service provider network in a FIFO buffer; and responsive to said CE transceiver detecting said second acknowledge message, initiating inverted mode transmission from said CE to said UE.

* * * * *